(12) United States Patent
Bito

(10) Patent No.: US 10,168,547 B2
(45) Date of Patent: Jan. 1, 2019

(54) ZOOM LENS SYSTEM, IMAGING APPARATUS, AND CAMERA

(71) Applicant: Panasonic Intellectual Property Management Co., Ltd., Osaka (JP)

(72) Inventor: Takakazu Bito, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/955,996

(22) Filed: Apr. 18, 2018

(65) Prior Publication Data

US 2018/0284478 A1 Oct. 4, 2018

Related U.S. Application Data

(62) Division of application No. 15/369,908, filed on Dec. 6, 2016, now abandoned.

(30) Foreign Application Priority Data

Dec. 25, 2015 (JP) .................. 2015-253870
Oct. 21, 2016 (JP) .................. 2016-206601

(51) Int. Cl.
*G02B 15/14* (2006.01)
*G02B 27/64* (2006.01)
*G02B 15/173* (2006.01)
*G02B 15/163* (2006.01)

(52) U.S. Cl.
CPC .......... *G02B 27/646* (2013.01); *G02B 15/14* (2013.01); *G02B 15/163* (2013.01); *G02B 15/173* (2013.01)

(58) Field of Classification Search
CPC ........ G02B 15/14; G02B 15/15; G02B 15/16; G02B 15/163; G02B 15/173; G02B 15/20; G02B 15/22; G02B 15/28; G02B 27/64; G02B 27/646
See application file for complete search history.

(56) References Cited

U.S. PATENT DOCUMENTS

| | | |
|---|---|---|
| 5,642,224 A | 6/1997 | Suzuki |
| 6,124,972 A | 9/2000 | Hayakawa et al. |
| 2011/0007403 A1 | 1/2011 | Matsuo |
| 2012/0019928 A1 | 1/2012 | Sato |
| 2012/0087017 A1 | 4/2012 | Fujisaki |
| 2014/0139722 A1 | 5/2014 | Sugita |

(Continued)

FOREIGN PATENT DOCUMENTS

JP 11-202201 7/1999

*Primary Examiner* — Thong Nguyen
(74) *Attorney, Agent, or Firm* — Wenderoth, Lind & Ponack, L.L.P.

(57) ABSTRACT

A zoom lens system according to the disclosure, in order from an object side to an image side, includes a first lens group with positive optical power, a second lens group with negative optical power, and a subsequent lens group composed of at least three lens groups. During zooming operation, the first lens group moves along the optical axis and the second lens group does not move. The second lens group has an aperture stop. The second lens group satisfies following condition (1), $$-9.0 \leq fG1/fG2 \leq -2.0 \qquad (1)$$

where
fG1 is the focal length of the first lens group, and
fG2 is the focal length of the second lens group.

8 Claims, 11 Drawing Sheets

(56) References Cited

U.S. PATENT DOCUMENTS

| | | | |
|---|---|---|---|
| 2015/0085165 A1* | 3/2015 | Maruyama | G02B 15/173 348/240.3 |
| 2016/0054548 A1* | 2/2016 | Chen | G02B 15/173 359/557 |
| 2016/0054550 A1 | 2/2016 | Bito et al. | |
| 2016/0170189 A1 | 6/2016 | Fujimoto et al. | |
| 2017/0261728 A1* | 9/2017 | Shibata | G02B 15/20 |

* cited by examiner

ZOOM LENS SYSTEM, IMAGING APPARATUS, AND CAMERA

BACKGROUND

1. Technical Field

The present disclosure relates to a zoom lens system that is compact and has a high optical performance across the entire zoom area in spite of the large diameter, and to an imaging apparatus and a camera that include the zoom lens system.

2. Description of the Related Art

Patent literature 1 discloses a zoom optical system configured so that its imaging element moves in the optical axis direction at least during zooming for higher magnification and a smaller size.

CITATION LIST

Patent literature

PTL 1 Japanese Patent Unexamined Publication No. H11-202201

SUMMARY

An object of the present disclosure is to provide a zoom lens system that is compact and has a high optical performance across the entire zoom area in spite of the high magnification, and an imaging apparatus and a camera that include the zoom lens system.

A zoom lens system according to the disclosure, in order from an object side to an image side, includes a first lens group with positive optical power, a second lens group with negative optical power, and a subsequent lens group composed of at least three lens groups.

During zooming operation, the first lens group moves along the optical axis and the second lens group does not move.

The second lens group has an aperture stop.

The second lens group satisfies following condition (1), $$-9.0 \leq fG1/fG2 \leq -2.0 \qquad (1)$$

where fG1 is the focal length of the first lens group, and
fG2 is the focal length of the second lens group.

The disclosure provides a zoom lens system that is compact and has a high optical performance across the entire zoom area in spite of the high magnification, and an imaging apparatus and a camera that include the zoom lens system.

DETAILED DESCRIPTION

Hereinafter, a detailed description is made of some embodiments with reference to the related drawings as appropriate. However, a detailed description more than necessary may be omitted, such as a description of a well-known item and a duplicate description for a substantially identical component, to avoid an unnecessarily redundant description and to allow those skilled in the art to easily understand the following description.

Note that the applicant provides accompanying drawings and the following description for those skilled in the art to well understand the disclosure and does not intend to limit the subjects described in the claims by the drawings and the description.

First Through Third Exemplary Embodiments

Figure 1:
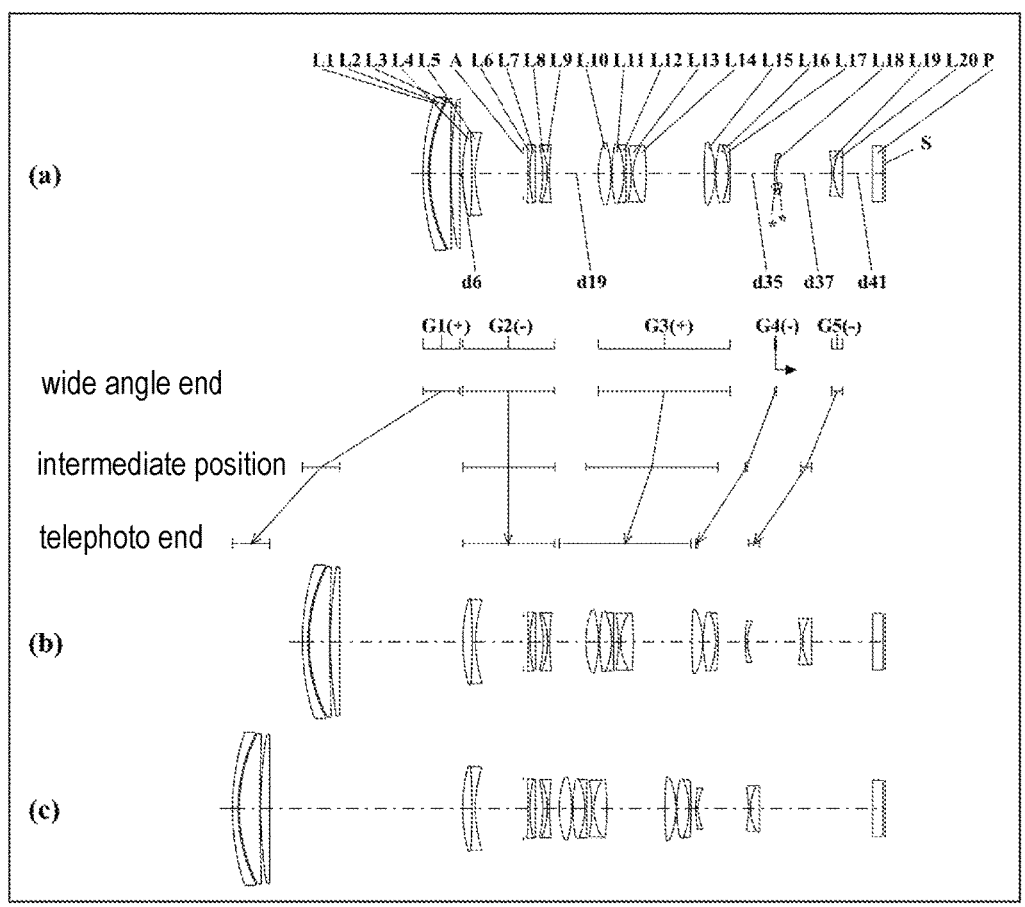
FIG. 1 is a lens layout diagram of a zoom lens system according to the first embodiment (numerical practical example 1), showing an infinity focusing state.
Figure 4:
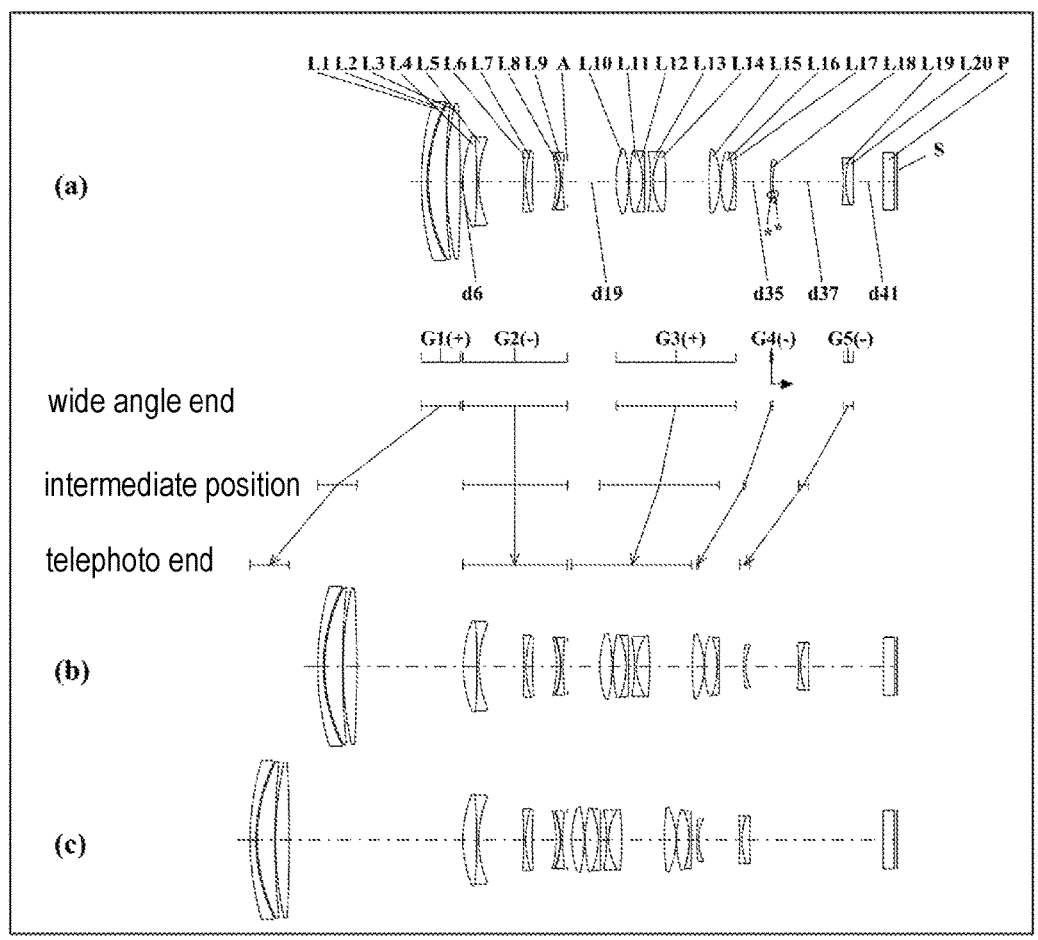
FIG. 4 is a lens layout diagram of a zoom lens system according to the second embodiment (numerical practical example 2), showing an infinity focusing state.
Figure 7:
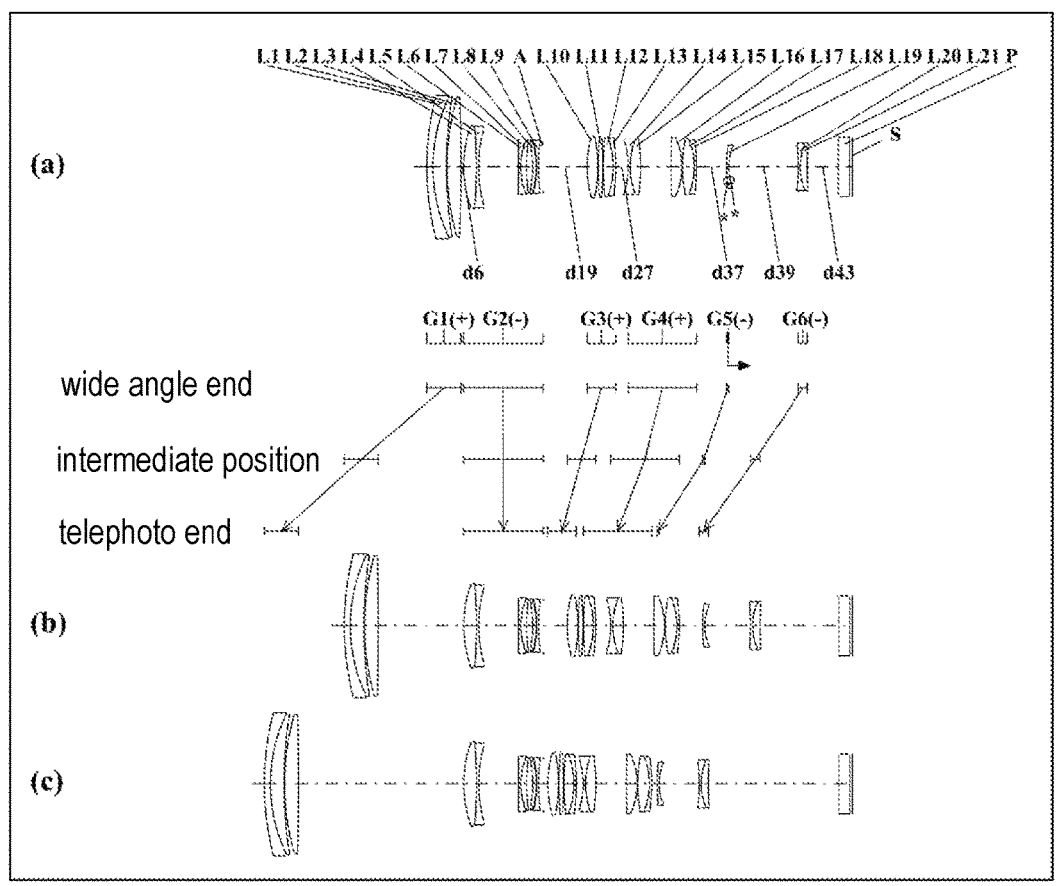
FIG. 7 is a lens layout diagram of a zoom lens system according to the third embodiment (numerical practical example 3), showing an infinity focusing state.

FIGS. 1, 4, and 7 are layout diagrams of the zoom lens systems according to the first through third embodiments, each illustrating a zoom lens system in an infinity focusing state.

In FIGS. 1, 4, and 7, part (a) shows a lens configuration of the wide-angle end (a state of the shortest focal length: fW); part (b), the intermediate position (a state of the intermediate focal length: $fM=(fW*fT)^{1/2}$ and part (c), the telephoto end (a state of the longest focal length: fT). In parts (a) through (c), one aspect ratio agrees with another.

In FIGS. 1, 4, and 7, zigzag arrows between parts (a) and (b) are straight lines connecting the positions of the lens groups in a state of the wide-angle end, intermediate position, and telephoto end, in sequence from the top. The parts between the wide-angle end and the intermediate position, and between the intermediate position and the telephoto end are simply connected by straight lines, which is different from actual movement of each lens group.

Further, in FIGS. 1, 4, and 7, the arrows on the lens groups indicate focusing from an infinity focusing state to a proximity focusing state. In FIGS. 1, 4, and 7, each mark of the lens groups is inscribed below each lens group in part (a), and thus arrows indicating focusing are inscribed below each mark of the lens groups for convenience. However, a direction in which each lens group moves for focusing in each zooming state is concretely described later for each embodiment.

In FIGS. 1, 4, and 7, an asterisk (*) inscribed on a specific surface represents the surface is aspheric. In FIGS. 1, 4, and 7, a symbol (+) and a symbol (−) affixed to each mark of the lens groups correspond to the sign of the optical power of each lens group. In FIGS. 1, 4, and 7, the straight line at the rightmost indicates the position of image surface S (the surface of the imaging element facing an object).

First Exemplary Embodiment

FIG. 1 illustrates a zoom lens system according to the first exemplary embodiment.

The zoom lens system is composed of first lens group G1 with positive optical power, second lens group G2 with negative optical power, third lens group G3 with positive optical power, fourth lens group G4 with negative optical power, fifth lens group G5 with negative optical power, and parallel plain plate P, in this order in the direction from an object to the image. Third lens group G3, fourth lens group G4, and fifth lens group G5 compose the subsequent lens group.

First lens group G1 is composed of first lens element L1 with negative optical power, second lens element L2 with positive optical power, and third lens element L3 with positive optical power, in this order in the direction from an object to the image.

Second lens group G2 is composed of fourth lens element L4 with positive optical power, fifth lens element L5 with negative optical power, aperture stop A, sixth lens element L6 with negative optical power, seventh lens element L7 with positive optical power, eighth lens element L8 with positive optical power, and ninth lens element L9 with negative optical power, in this order in the direction from an object to the image. Fourth lens element L4 and fifth lens element L5 are bonded together with a bonding material for example to form a cemented lens, and so are sixth lens element L6 and seventh lens element L7, and eighth lens element L8 and ninth lens element L9.

Third lens group G3 is composed of tenth lens element L10 with positive optical power, eleventh lens element L11 with positive optical power, twelfth lens element L12 with negative optical power, thirteenth lens element L13 with negative optical power, fourteenth lens element L14 with positive optical power, fifteenth lens element L15 with positive optical power, sixteenth lens element L16 with positive optical power, and seventeenth lens element L17 with negative optical power, in this order in the direction from an object to the image. Eleventh lens element L11 and twelfth lens element L12 are bonded together with a bonding material for example to form a cemented lens, and so are thirteenth lens element L13 and fourteenth lens element L14, and sixteenth lens element L16 and seventeenth lens element L17.

Fourth lens group G4 is a single lens and is composed of eighteenth lens element L18 with negative optical power.

Fifth lens group G5 is composed of nineteenth lens element L19 with negative optical power and twentieth lens element L20 with positive optical power, in this order in the direction from an object to the image. Nineteenth lens element L19 and twentieth lens element L20 are bonded together with a bonding material for example to form a cemented lens.

Each lens element is described.

The lens elements in first lens group G1 are described. First lens element L1 is a meniscus lens having a convex surface facing an object. Second lens element L2 is a meniscus lens having a convex surface facing an object. Third lens element L3 is a meniscus lens having a convex surface facing an object.

The lens elements in second lens group G2 are described. Fourth lens element L4 is a biconvex lens. Fifth lens element L5 is a biconcave lens. Sixth lens element L6 is a biconcave lens. Seventh lens element L7 is a meniscus lens having a convex surface facing an object. Eighth lens element L8 is a meniscus lens having a concave surface facing an object. Ninth lens element L9 is a biconcave lens.

The lens elements in third lens group G3 are described. Tenth lens element L10 is a biconvex lens. Eleventh lens element L11 is a biconvex lens. Twelfth lens element L12 is a biconcave lens. Thirteenth lens element L13 is a biconcave lens. Fourteenth lens element L14 is a biconvex lens. Fifteenth lens element L15 is a biconvex lens. Sixteenth lens element L16 is a biconvex lens. Seventeenth lens element L17 is a meniscus lens having a concave surface facing an object.

The lens elements in fourth lens group G4 are described. Eighteenth lens element L18 is a meniscus lens having a convex surface facing an object and both surfaces of the lens are aspheric.

The lens elements in fifth lens group G5 are described. Nineteenth lens element L19 is a biconcave lens. Twentieth lens element L20 is a meniscus having a convex surface facing an object.

When the zoom lens system zooms from the wide-angle end to the telephoto end in imaging, first lens group G1, third lens group G3, fourth lens group G4, and fifth lens group G5 move toward an object, but second lens group G2 and image surface S do not move. In other words, each lens group moves along the optical axis when zooming so that the distance between first lens group G1 and second lens group G2 increases; second lens group G2 and third lens group G3, decreases; third lens group G3 and fourth lens group G4, decreases; and fourth lens group G4 and fifth lens group G5, decreases. Besides, as shown in FIG. 1, when the zoom lens system zooms from the wide-angle end to the telephoto end, the full-aperture diameter of aperture stop A increases.

When the zoom lens system focuses from an infinity focusing state to a proximity focusing state, fourth lens group G4 moves along the optical axis toward the image.

Here, seventh lens element L7 and eighth lens element L8, which are part of second lens group G2, move vertically to the optical axis in order to optically correct image blurring. These seventh lens element L7 and eighth lens element L8 correct the image point shift due to vibration of the entire system. That is, the elements optically correct image blurring due to hand shake or vibration for example.

Second Exemplary Embodiment

FIG. 4 illustrates a zoom lens system according to the second exemplary embodiment.

The zoom lens system is composed of first lens group G1 with positive optical power, second lens group G2 with negative optical power, third lens group G3 with positive optical power, fourth lens group G4 with negative optical power, fifth lens group G5 with positive optical power, and parallel plain plate P, in this order in the direction from an object to the image. Third lens group G3, fourth lens group G4, and fifth lens group G5 compose the subsequent lens group.

First lens group G1 is composed of first lens element L1 with negative optical power, second lens element L2 with positive optical power, and third lens element L3 with positive optical power, in this order in the direction from an object to the image.

Second lens group G2 is composed of fourth lens element L4 with positive optical power, fifth lens element L5 with negative optical power, sixth lens element L6 with negative optical power, seventh lens element L7 with positive optical power, eighth lens element L8 with positive optical power, ninth lens element L9 with negative optical power, and aperture stop A, in this order in the direction from an object to the image. Fourth lens element L4 and fifth lens element L5 are bonded together with a bonding material for example to form a cemented lens, and so are sixth lens element L6 and seventh lens element L7.

Third lens group G3 is composed of tenth lens element L10 with positive optical power, eleventh lens element L11 with positive optical power, twelfth lens element L12 with negative optical power, thirteenth lens element L13 with negative optical power, fourteenth lens element L14 with positive optical power, fifteenth lens element L15 with positive optical power, sixteenth lens element L16 with positive optical power, and seventeenth lens element L17 with negative optical power, in this order in the direction from an object to the image. Eleventh lens element L11 and twelfth lens element L12 are bonded together with a bonding material for example to form a cemented lens, and so are thirteenth lens element L13 and fourteenth lens element L14, and sixteenth lens element L16 and seventeenth lens element L17.

Fourth lens group G4 is a single lens and is composed of eighteenth lens element L18 with negative optical power.

Fifth lens group G5 is composed of nineteenth lens element L19 with negative optical power and twentieth lens element L20 with positive optical power, in this order in the direction from an object to the image. Nineteenth lens element L19 and twentieth lens element L20 are bonded together with a bonding material for example to form a cemented lens.

Each lens element is described.

The lens elements in first lens group G1 are described. First lens element L1 is a meniscus lens having a convex surface facing an object. Second lens element L2 is a meniscus lens having a convex surface facing an object. Third lens element L3 is a biconvex lens.

The lens elements in second lens group G2 are described. Fourth lens element L4 is a biconvex lens. Fifth lens element L5 is a biconcave lens. Sixth lens element L6 is a biconcave lens. Seventh lens element L7 is a meniscus lens having a convex surface facing an object. Eighth lens element L8 is a meniscus lens having a concave surface facing an object. Ninth lens element L9 is a biconcave lens.

The lens elements in third lens group G3 are described. Tenth lens element L10 is a biconvex lens. Eleventh lens element L11 is a biconvex lens. Twelfth lens element L12 is a meniscus lens having a concave surface facing an object. Thirteenth lens element L13 is a biconcave lens. Fourteenth lens element L14 is a biconvex lens. Fifteenth lens element L15 is a biconvex lens. Sixteenth lens element L16 is a biconvex lens. Seventeenth lens element L17 is a meniscus lens having a concave surface facing an object.

The lens elements in fourth lens group G4 are described. Eighteenth lens element L18 is a meniscus lens having a convex surface facing an object and both surfaces of the lens are aspheric.

The lens elements in fifth lens group G5 are described. Nineteenth lens element L19 is a biconcave lens. Twentieth lens element L20 is a meniscus having a convex surface facing an object.

When the zoom lens system zooms from the wide-angle end to the telephoto end in imaging, first lens group G1, third lens group G3, fourth lens group G4, and fifth lens group G5 move toward an object, but second lens group G2 and image surface S do not move. In other words, each lens group moves along the optical axis when zooming so that the distance between first lens group G1 and second lens group G2 increases; second lens group G2 and third lens group G3, decreases; third lens group G3 and fourth lens group G4, decreases; and fourth lens group G4 and fifth lens group G5, decreases. Besides, as shown in FIG. 4, when the zoom lens system zooms from the wide-angle end to the telephoto end, the full-aperture diameter of aperture stop A increases.

When the zoom lens system focuses from an infinity focusing state to a proximity focusing state, fourth lens group G4 moves along the optical axis toward the image.

Here, seventh lens element L7 and eighth lens element L8, which are part of second lens group G2, move vertically to the optical axis in order to optically correct image blurring. These seventh lens element L7 and eighth lens element L8 correct the image point shift due to vibration of the entire system. That is, the elements optically correct image blurring due to hand shake or vibration for example.

Third Exemplary Embodiment

FIG. 7 illustrates a zoom lens system according to the third exemplary embodiment.

The zoom lens system is composed of first lens group G1 with positive optical power, second lens group G2 with negative optical power, third lens group G3 with positive optical power, fourth lens group G4 with positive optical power, fifth lens group G5 with negative optical power, sixth lens group G6 with negative optical power, and parallel plain plate P, in this order in the direction from an object to the image. Third lens group G3, fourth lens group G4, fifth lens group G5, and sixth lens group G6 compose the subsequent lens group.

First lens group G1 is composed of first lens element L1 with negative optical power, second lens element L2 with positive optical power, and third lens element L3 with positive optical power, in this order in the direction from an object to the image. First lens element L1 and second lens element L2 are bonded together with a bonding material for example to form a cemented lens.

Second lens group G2 is composed of fourth lens element L4 with positive optical power, fifth lens element L5 with negative optical power, sixth lens element L6 with negative optical power, seventh lens element L7 with positive optical power, eighth lens element L8 with positive optical power, ninth lens element L9 with negative optical power, and aperture stop A, in this order in the direction from an object to the image. Fourth lens element L4 and fifth lens element L5 are bonded together with a bonding material for example to form a cemented lens, and so are sixth lens element L6 and seventh lens element L7.

Third lens group G3 is composed of tenth lens element L10 with positive optical power, eleventh lens element L11 with positive optical power, twelfth lens element L12 with positive optical power, and thirteenth lens element L13 with negative optical power, in this order in the direction from an object to the image. Twelfth lens element L12 and thirteenth lens element L13 are bonded together with a bonding material for example to form a cemented lens.

Fourth lens group G4 is composed of fourteenth lens element L14 with negative optical power, fifteenth lens element L15 with positive optical power, sixteenth lens element L16 with positive optical power, seventeenth lens element L17 with positive optical power, and eighteenth L18 with negative optical power, in this order in the direction from an object to the image. Seventeenth lens element L17 and eighteenth lens element L18 are bonded together with a bonding material for example to form a cemented lens.

Fifth lens group G5 is a single lens and is composed of nineteenth lens element L19 with negative optical power.

Sixth lens group G6 is composed of twentieth lens element L20 with negative optical power and twenty-first lens element L21 with positive optical power, in this order in the direction from an object to the image. Twentieth lens element L20 and twenty-first lens element L21 are bonded together with a bonding material for example to form a cemented lens.

Each lens element is described.

The lens elements in first lens group G1 are described. First lens element L1 is a meniscus lens having a convex surface facing an object. Second lens element L2 is a meniscus lens having a convex surface facing an object. Third lens element L3 is a biconvex lens.

The lens elements in second lens group G2 are described. Fourth lens element L4 is a biconvex lens. Fifth lens element L5 is a biconcave lens. Sixth lens element L6 is a biconcave lens. Seventh lens element L7 is a meniscus lens having a convex surface facing an object. Eighth lens element L8 is a meniscus lens having a concave surface facing an object. Ninth lens element L9 is a biconcave lens.

The lens elements in third lens group G3 are described. Tenth lens element L10 is a biconvex lens. Eleventh lens element L11 is a biconvex lens. Twelfth lens element L12 is a biconvex lens. Thirteenth lens element L13 is a meniscus lens having a concave surface facing an object.

The lens elements in fourth lens group G4 are described. Fourteenth lens element L14 is a biconvex lens. Fifteenth lens element L15 is a biconvex lens. Sixteenth lens element L16 is a biconvex lens. Seventeenth lens element L17 is a biconvex lens. Eighteenth lens element L18 is a meniscus lens having a concave surface facing an object.

The lens elements in fifth lens group G5 are described. Nineteenth lens element L19 is a meniscus having a convex surface facing an object and both surfaces of the lens are aspheric.

The lens elements in sixth lens group G6 are described. Twentieth lens element L20 is a biconcave lens. Twenty-first lens element L21 is a meniscus lens having a convex surface facing an object.

When the zoom lens system zooms from the wide-angle end to the telephoto end in imaging, first lens group G1, third lens group G3, fourth lens group G4, fifth lens group G5, and sixth lens group G6 move toward an object, but second lens group G2 and image surface S do not move. In other words, each lens group moves along the optical axis when zooming so that the distance between first lens group G1 and second lens group G2 increases; second lens group G2 and third lens group G3, decreases; third lens group G3 and fourth lens group G4, decreases; fourth lens group G4 and fifth lens group G5, decreases; and fifth lens group G5 and sixth lens group G6, decreases. Besides, as shown in FIG. 7, when the zoom lens system zooms from the wide-angle end to the telephoto end, the full-aperture diameter of aperture stop A increases.

When the zoom lens system focuses from an infinity focusing state to a proximity focusing state, fifth lens group G5 moves along the optical axis toward the image.

Here, seventh lens element L7 and eighth lens element L8, which are part of second lens group G2, move vertically to the optical axis in order to optically correct image blurring. These seventh lens element L7 and eighth lens element L8 correct the image point shift due to vibration of the entire system. That is, the elements optically correct image blurring due to hand shake or vibration for example.

Other Exemplary Embodiments

Hereinbefore, the first through third embodiments are described to exemplify the technology disclosed in this patent application. The technology of the disclosure, however, is not limited to these embodiments, but is applicable to other embodiments appropriately devised through modification, substitution, addition, and omission for example.

As an example of aperture stop A positioned where it is integrated with second lens group G2, aperture stop A is between fifth lens element L5 and sixth lens element L6 in the first embodiment. However, aperture stop A may be between other two lens elements in second lens group G2. In the second and third embodiments, aperture stop A is closest to an image in second lens group G2; however, aperture stop A may be closest to an object in second lens group G2. Aperture stop A has only to be positioned where it is integrated with second lens group G2 and does not move.

Conditions and Advantages

Hereinafter, a description is made of conditions that can be satisfied by a zoom lens system according to the first through third embodiments for example. Here, some possible conditions are defined for a zoom lens system according to the first through third embodiments, and a zoom lens system that satisfies all the conditions is most effective. However, by satisfying an individual condition, a zoom lens system that provides a corresponding advantage can be achieved as well.

A zoom lens system includes a first lens group with positive optical power, a second lens group with negative optical power, and a subsequent lens group composed of at least three lens groups with positive optical power as a whole.

During zooming operation, the first lens group moves along the optical axis; the second lens group does not.

The zoom lens system has an aperture stop at a position where it is integrated with the second lens group.

Then, it is desirable for example that the zoom lens system satisfies following condition (1), $$-9.0 \leq fG1/fG2 \leq -2.0 \tag{1}$$

where fG1: the focal length of the first lens group fG2: the focal length of the second lens group.

Concrete values of the focal lengths of the first and second lens groups are shown in tables 3C, 6C, and 9C of numerical practical examples 1 through 3 (described later).

Condition (1) defines the ratio of the focal length of the first lens group to that of the second one. A ratio smaller than the lower limit of condition (1) results in a too long focal length of the first lens group, which causes a longer moving distance of the first lens group during zooming operation as well as a too large total optical length at the telephoto end. This makes it difficult to provide a compact lens barrel, imaging apparatus, and camera. Meanwhile, a ratio larger than the upper limit of condition (1) results in a too short focal length of the first lens group, which makes it difficult to correct various aberrations across the entire system, and so does to achieve a desired optical performance.

Preferably, satisfying condition (1)' further increases the above-described effectiveness.

$$-5.0 \leq fG1/fG2 \leq -3.0 \tag{1}'$$

Further, it is desirable for example that the zoom lens system satisfies following condition (2), $$0.4 \leq LG2a/LG2 \leq 0.9 \tag{2}$$

where

LG2a: the largest size of air spaces in the second lens group

LG2: the thickness of the second lens group in the optical axis direction.

Concrete values of air spaces in the second lens group are shown as surface distance d in tables 1, 4, and 7 of numerical practical examples 1 through 3 (described later). Concrete values of the thickness of the second lens group in the optical axis direction are shown as lens configuration length in tables 3C, 6C, and 9C of numerical practical examples 1 through 3 (described later).

Condition (2) defines the ratio of the largest size of air spaces in the second lens group to the thickness of the second lens group in the optical axis direction. A ratio larger than the lower limit of condition (2) results in the largest size of air spaces in the second lens group not too small. This allows various aberrations (especially spherical aberration and coma aberration) to be adequately corrected. Meanwhile, a ratio smaller than the upper limit of condition (2) results in the largest size of air spaces in the second lens group not too large. This leads to an appropriate total optical length to provide a compact lens barrel, imaging apparatus, and camera.

Preferably, satisfying condition (2)' further increases the above-described effectiveness.

$$0.4 \leq LG2a/LG2 \leq 0.7 \tag{2}'$$

It is desirable for example that part of the second lens group moves so as to have a component in a direction perpendicular to the optical axis during image blur correction.

This decreases the lens diameter for a smaller and lighter image blur correction lens group, which allows driving the lens group with a simple driving mechanism.

A zoom lens system according to the first through third embodiments corrects blurring by moving the image blur correction lens element in a direction vertical to the optical axis. The movement method is capable of image blur correction if the lens element is moved so as to have a component in a vertical direction. For example, if the lens barrel structure is allowed to be more complicated, blurring may be corrected by rotating the image blur correction lens element so that the element has a rotation center on the optical axis.

It is desirable for example that each of the three lens elements composing the first lens group of the zoom lens system is a single lens.

This increases air spaces to enhance the design flexibility for facilitating aberration correction.

Figure 10:
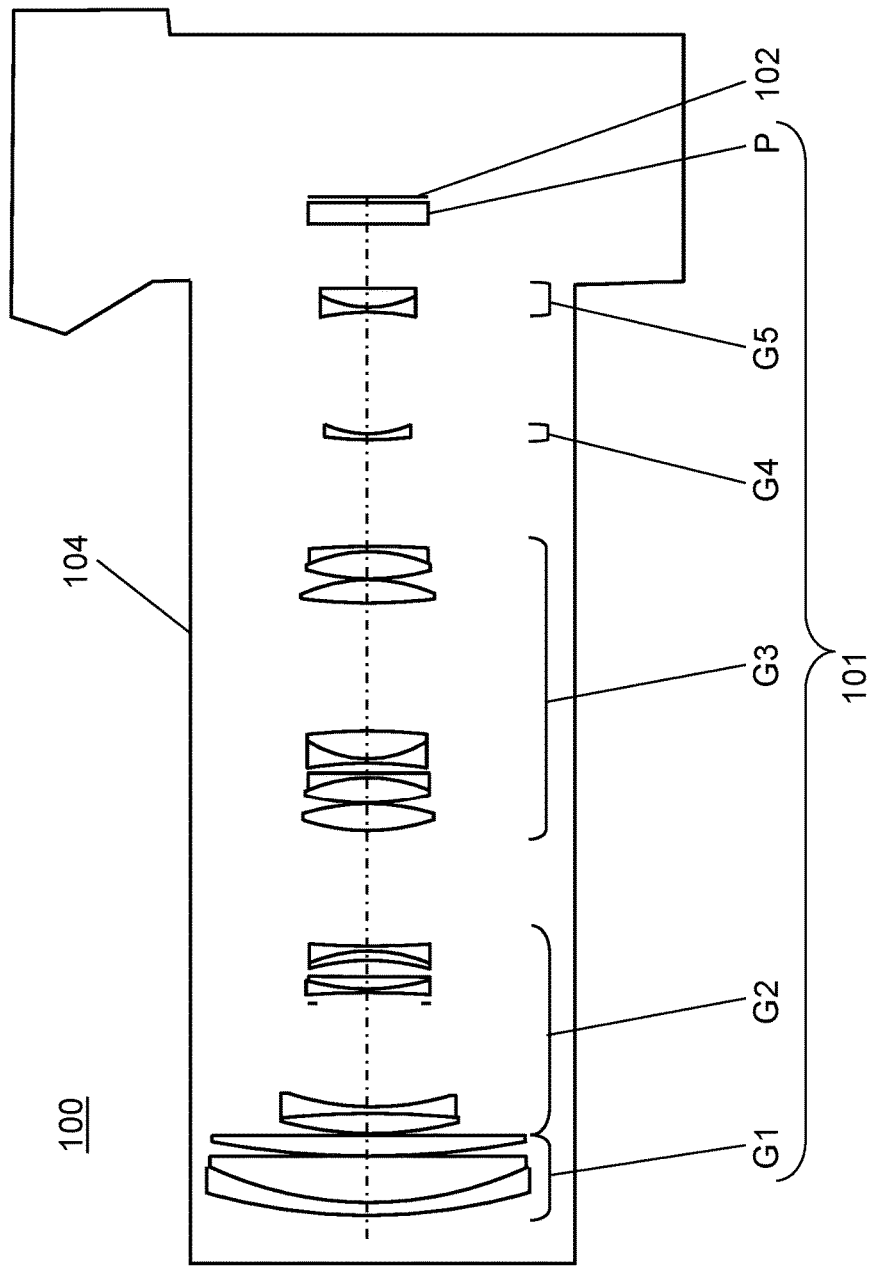
FIG. 10 is an outline block diagram of an imaging apparatus to which the zoom lens system according to the first embodiment has been applied.

An Outline Structure of an Imaging Apparatus to which the First Embodiment has been Applied FIG. 10 illustrates an outline structure of an imaging apparatus to which a zoom lens system according to the first embodiment has been applied. Note that a zoom lens system according to the second and third exemplary embodiments can be also applied to an imaging apparatus.

Imaging apparatus 100 is composed of housing 104, imaging element 102, and zoom lens system 101. A concrete example of imaging apparatus 100 is a digital camera.

Zoom lens system 101 includes an actuator and a lens frame for example contained in housing 104 so that first lens group G1, third lens group G3, fourth lens group G4, and fifth lens group G5 move during zooming operation.

This allows providing an imaging apparatus that is compact and has a high optical performance across the entire zoom area in spite of the large diameter.

The description is made of the example where a zoom lens system according to first embodiment has been applied to a digital camera; the zoom lens system can be also applied to a smartphone for example.

An Outline Structure of a Camera to which the First Embodiment has been Applied

Figure 11:
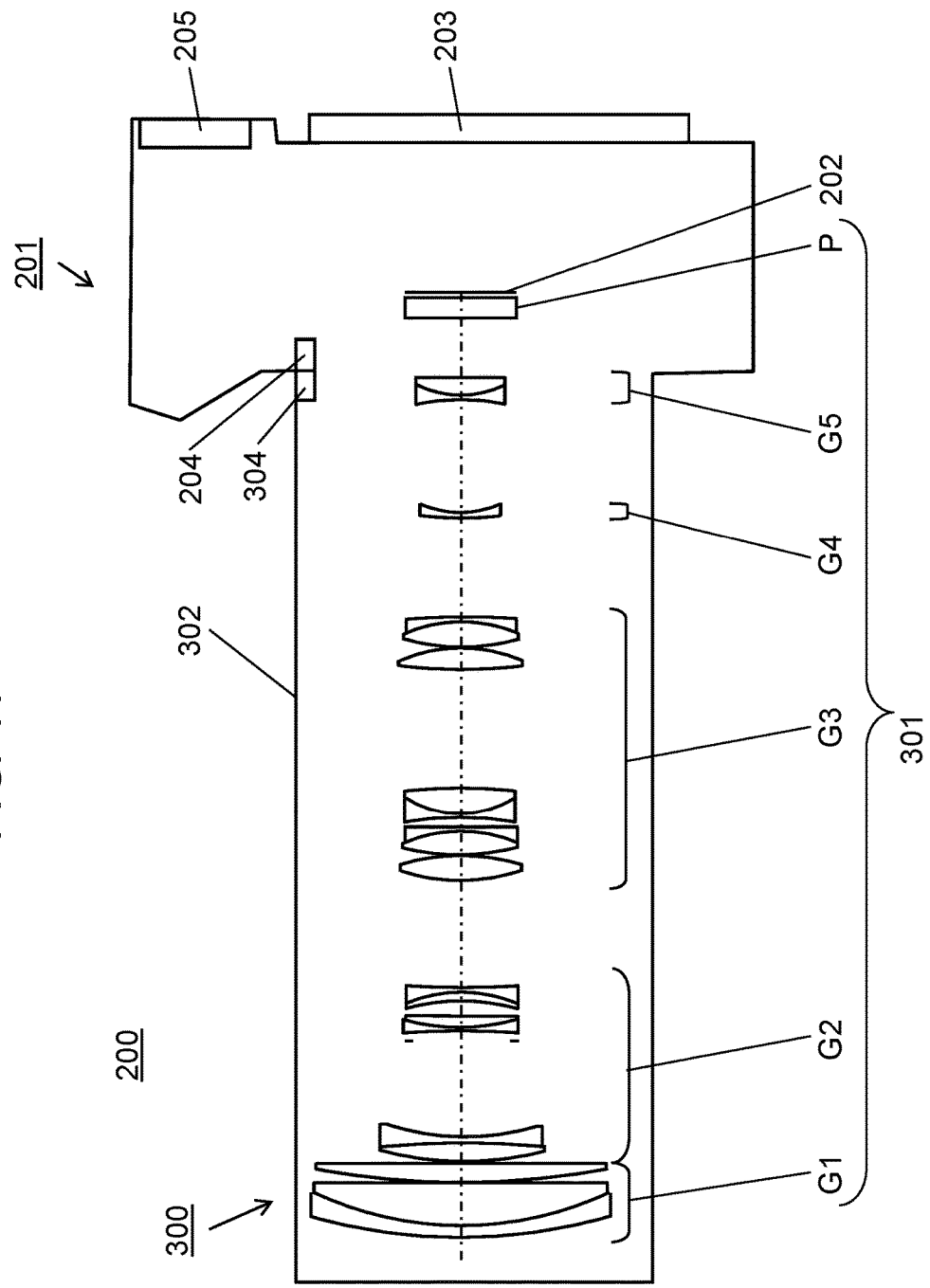
FIG. 11 is an outline block diagram of a camera to which the zoom lens system according to the first embodiment has been applied.

FIG. 11 illustrates an outline structure of a camera to which a zoom lens system according to the first embodiment has been applied. Note that a zoom lens system according to the second and third exemplary embodiments can be also applied to a camera.

Camera 200 includes camera body 201 and interchangeable lens device 300 detachably connected to camera body 201.

Camera body 201 includes imaging element 202, monitor 203, memory (unillustrated), camera mount unit 204, and finder 205. Imaging element 202 receives an optical image formed by the zoom lens system of interchangeable lens device 300 and converts the image to an electrical image signal. Monitor 203 displays the image signal. The memory stores the image signal.

Interchangeable lens device 300 includes lens barrel 302 and lens mount unit 304. Lens barrel 302 holds first lens group G1, second lens group G2, third lens group G3, fourth lens group G4, and fifth lens group G5. Lens mount unit 304 is connected to camera mount unit 204 of camera body 201.

Camera mount unit 204 and lens mount unit 304 function as an interface that electrically, as well as physically, connects the controller (unillustrated) inside camera body 201 with the controller (unillustrated) inside interchangeable lens device 300 to allow mutual signal exchanges.

Zoom lens system 301 is composed of the lens groups held by lens barrel 302, and parallel plain plate P of camera body 201. Zoom lens system 301 includes an actuator and a lens frame that are controlled by the controller inside interchangeable lens device 300 so that first lens group G1, third lens group G3, fourth lens group G4, and fifth lens group G5 move during zooming operation.

This allows providing a camera that is compact and has a high optical performance across the entire zoom area in spite of the large diameter.

Numerical Practical Examples

Hereinafter, a description is made of some numerical practical examples from concrete zoom lens systems according to the first through third embodiments. The practical examples represent each length in the tables in the unit of mm; and each view angle, in the unit of ° (degree). In the practical examples, r is a curvature radius; d, a surface distance; nd, a refractive index for d-line; and vd, an Abbe number for d-line. In the practical examples, a surface with an * mark is aspheric and its shape is defined by the following expression, $$Z = \frac{h^2/r}{1 + \sqrt{1 - (1+\kappa)(h/r)^2}} + \Sigma A_n h^n \quad \text{[Expression 1]}$$

where

Z: the distance from a point on an aspheric surface (the height from the optical axis is h) to the tangent plane at the apex of the aspheric surface h: the height from the optical axis r: the curvature radius at the apex κ: conic constant $A_n$: n-degree aspherical coefficient.

Figure 2:
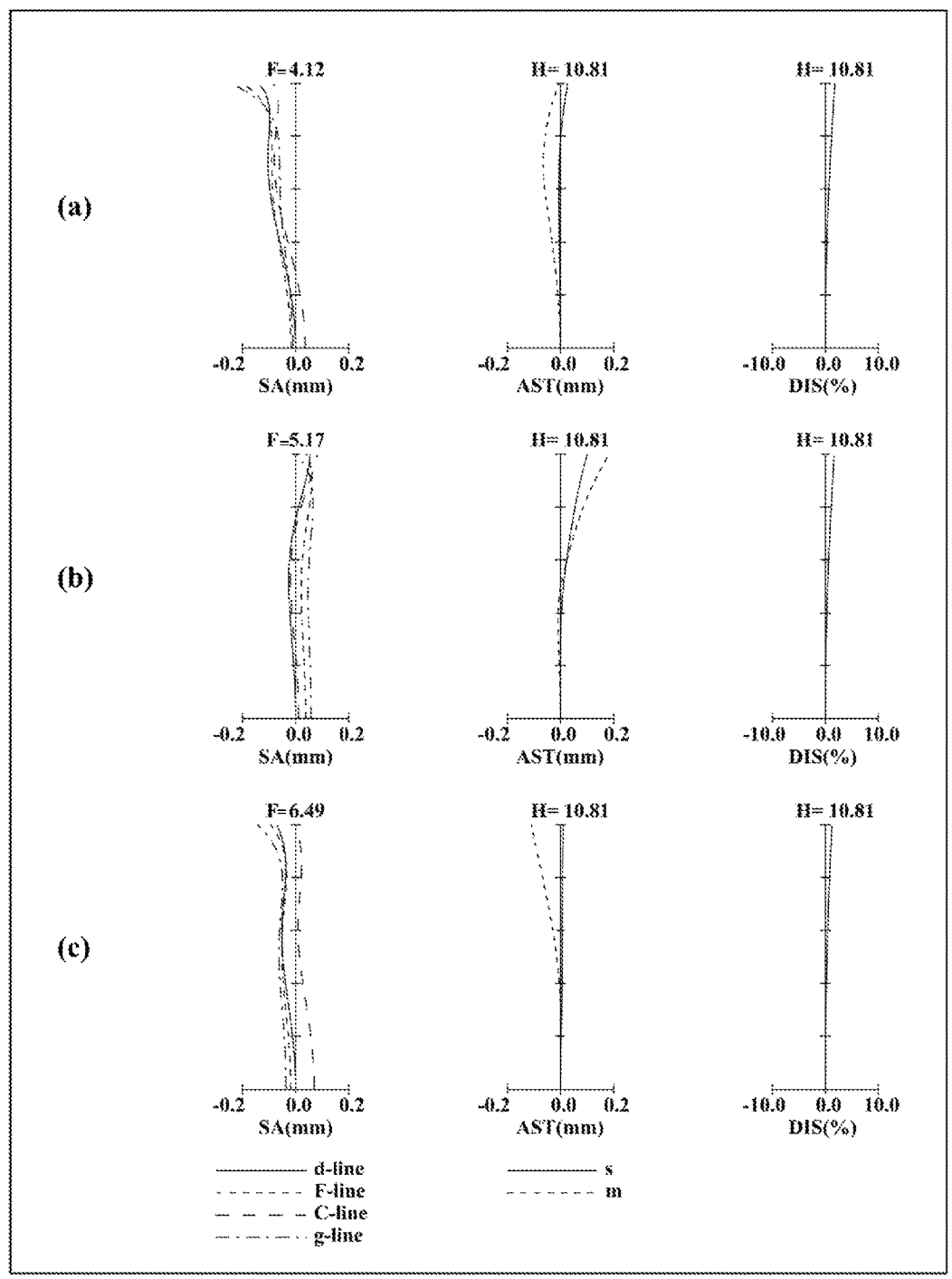
FIG. 2 is a longitudinal aberration diagram of the zoom lens system according to the first embodiment, in an infinity focusing state.
Figure 5:
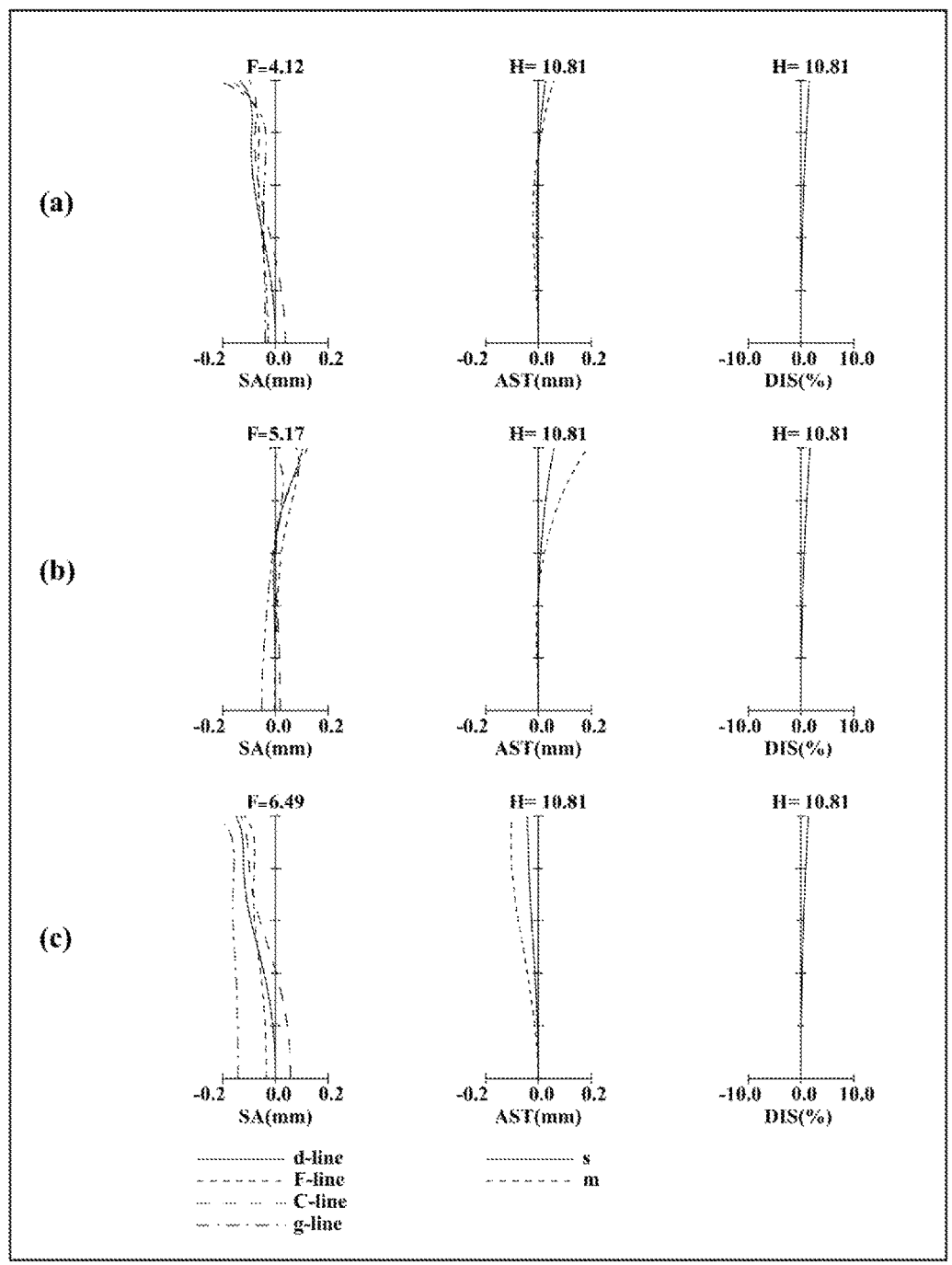
FIG. 5 is a longitudinal aberration diagram of the zoom lens system according to the second embodiment, in an infinity focusing state.
Figure 8:
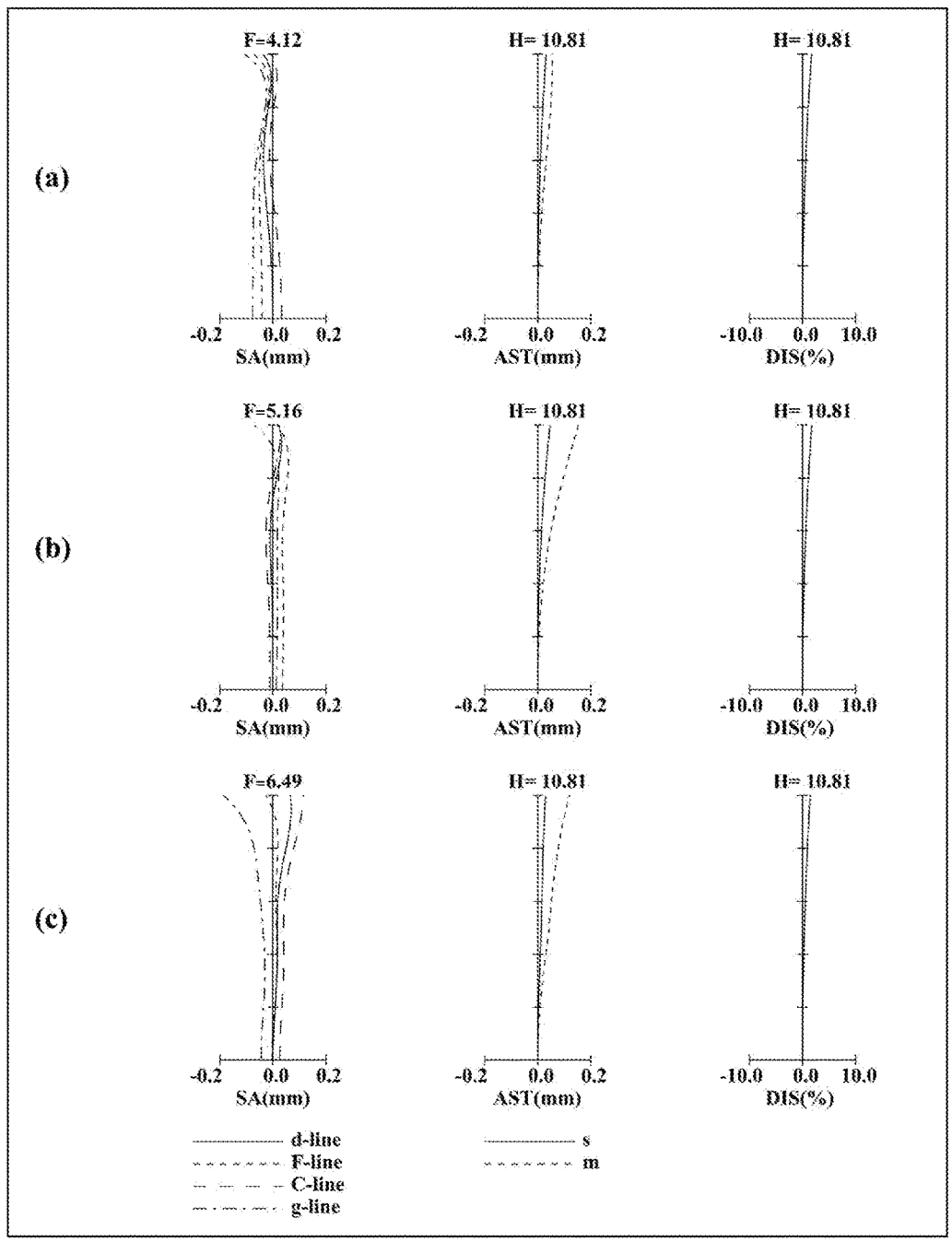
FIG. 8 is a longitudinal aberration diagram of the zoom lens system according to the third embodiment, in an infinity focusing state.

FIGS. 2, 5, and 8 are longitudinal aberration diagrams of zoom lens systems according to practical examples 1 through 3, in an infinity focusing state.

In each longitudinal aberration diagram, part (a) shows aberration at the wide-angle end; part (b), at an intermediate position; and part (c), at the telephoto end. Each longitudinal aberration diagram shows spherical aberration (SA (mm)), astigmatism (AST (mm)), and distortion aberration (DIS (%)), in this sequence from the left. In a spherical aberration diagram, the vertical axis represents F number (shown by F in the figure). A solid line represents the characteristics of d-line; a short broken line, of F-line; a long broken line, of C-line; and an alternate long and short dashline, of g-line. In an astigmatism diagram, the vertical axis represents the image height (shown by H in the diagram). A solid line represents the characteristics of the sagittal plane (shown by s in the diagram); a broken line, of the meridional plane (shown by m in the diagram). In a distortion aberration diagram, the vertical axis represents the image height (shown by H in the diagram).

Figure 3:
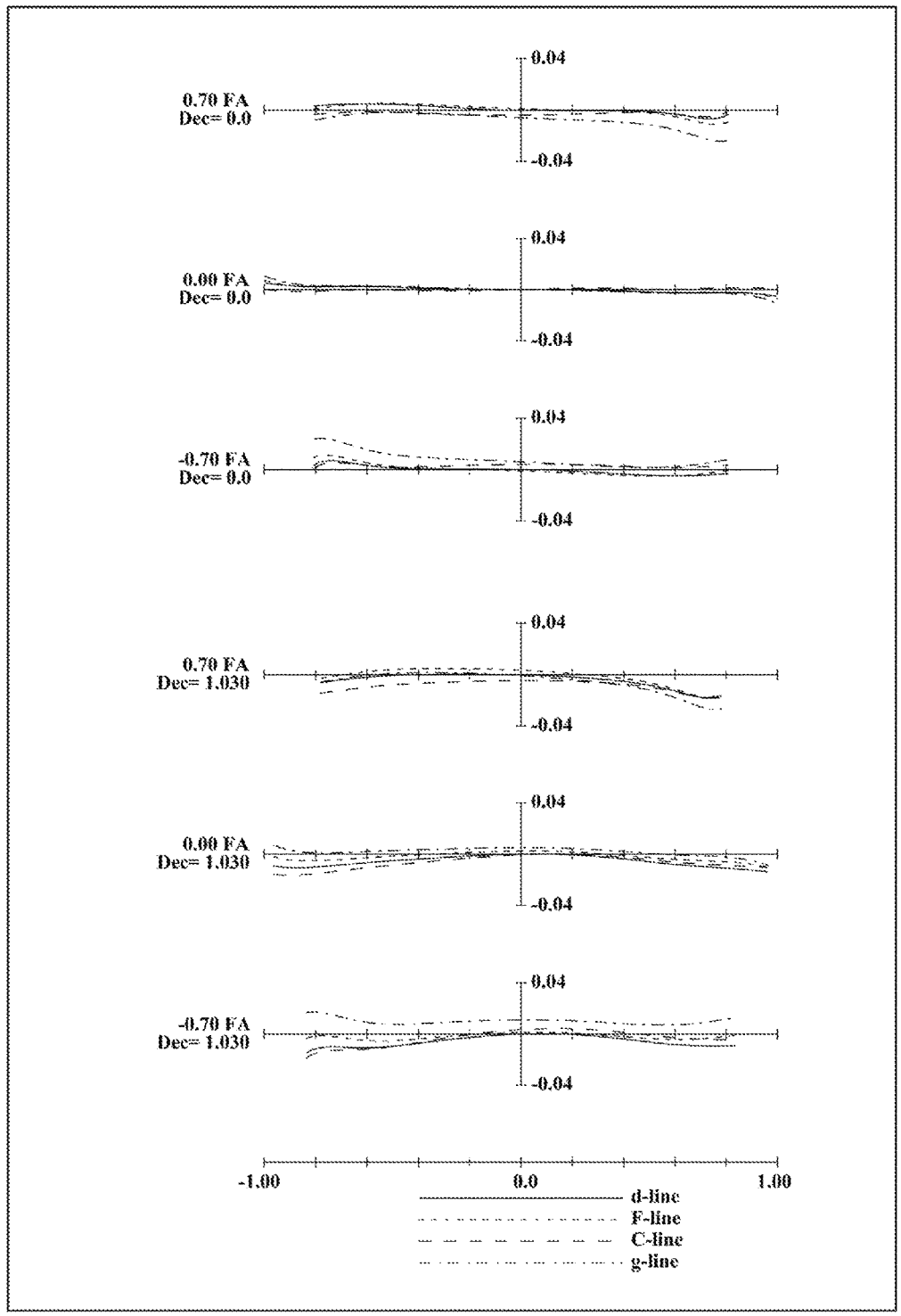
FIG. 3 is a lateral aberration diagram of the zoom lens system according to the first embodiment, at the telephoto end in a basic state (image blur correction is not being performed) and in an image blur correction state.
Figure 6:
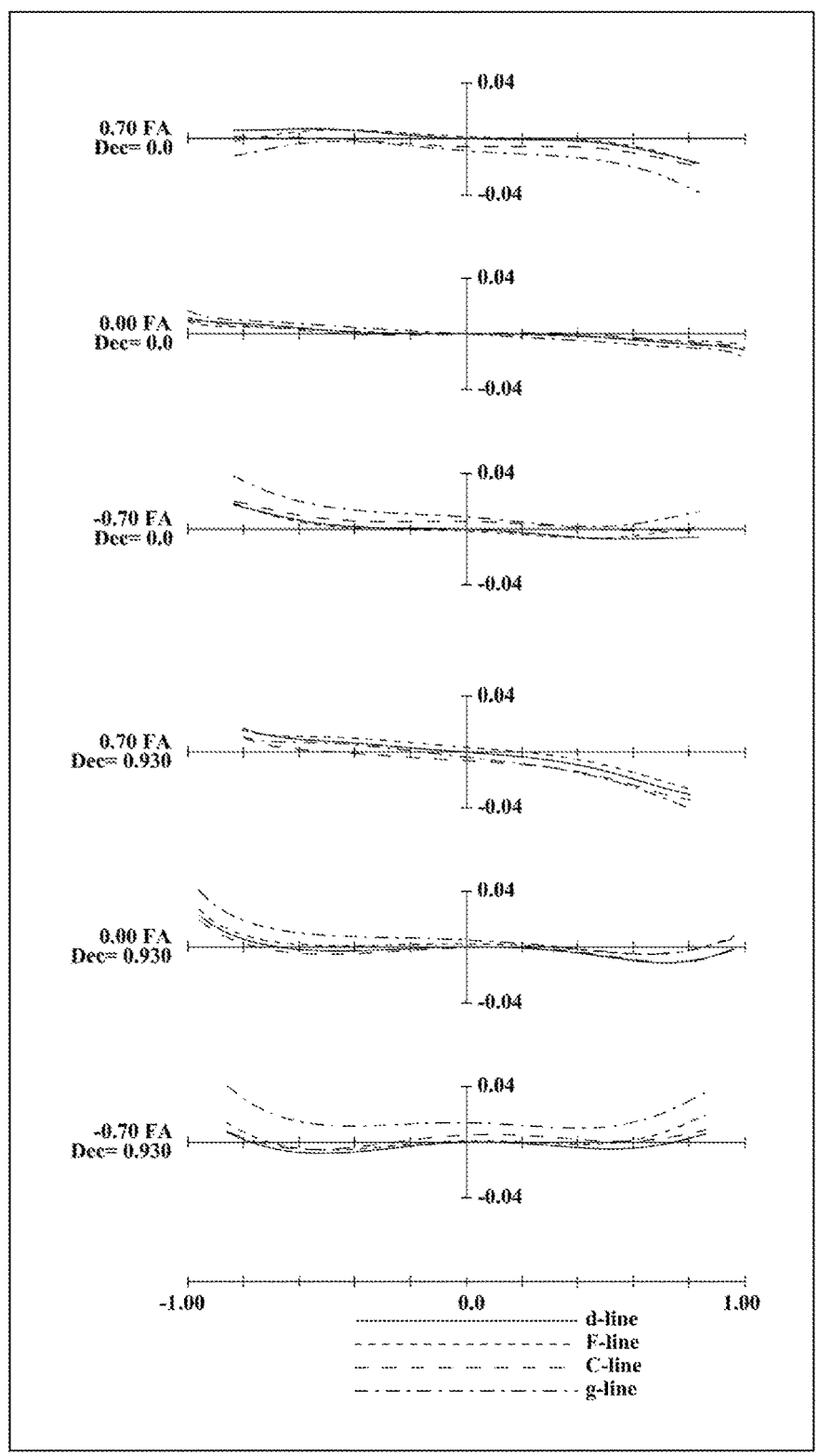
FIG. 6 is a lateral aberration diagram of the zoom lens system according to the second embodiment, at the telephoto end in a basic state (image blur correction is not being performed) and in an image blur correction state.
Figure 9:
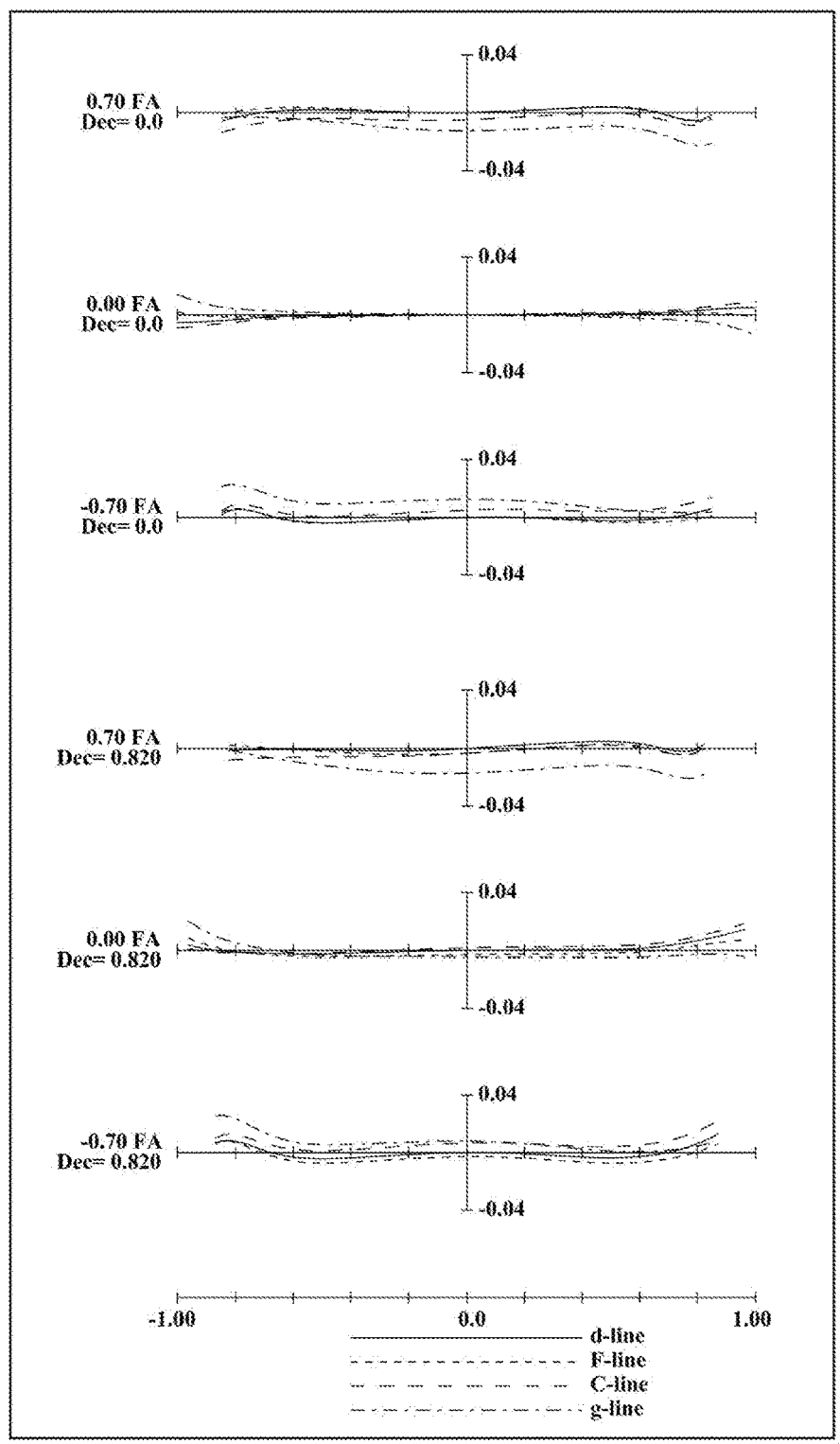
FIG. 9 is a lateral aberration diagram of the zoom lens system according to the third embodiment, at the telephoto end in a basic state (image blur correction is not being performed) and in an image blur correction state.

FIGS. 3, 6, and 9 are lateral aberration diagrams of zoom lens systems according to first through third embodiments, at the telephoto end.

In each lateral aberration diagram, the upper three aberration diagrams correspond to a basic state, where blurring at the telephoto end is not corrected. The lower three aberration diagrams correspond to an image blur correction state at the telephoto end in a case where the image blur correction lens group has been moved by a given amount in a direction vertical to the optical axis. In each lateral aberration diagram in a basic state, the top corresponds to lateral aberration at an image point of 70% of the maximum image height; the middle, to lateral aberration at an image point on the axis; and the bottom, to lateral aberration at an image point of −70% of the maximum image height. In each lateral aberration diagram in an image blur correction state, the top corresponds to lateral aberration at an image point of 70% of the maximum image height; the middle, to lateral aberration at an image point on the axis; and the bottom, to lateral aberration at an image point of −70% of the maximum image height. In each lateral aberration diagram, the horizontal axis represents the distance from the main light beam on the pupil surface. A solid line shows the characteristics of d-line; a short broken line, of F-line, a long broken line, of C-line; and an alternate long and short dashline, of g-line. In each lateral aberration diagram, a meridional plane is defined as a surface containing the optical axis of first lens group G1 and the optical axis of second lens group G2 (practical examples 1 through 3).

For the zoom lens systems of each practical example, the distance by which an image blur correction lens group moves in a direction vertical to the optical axis in an image blur correction state at the telephoto end is shown below.

| | |
|---|---|
| Practical example 1 | 1.030 mm |
| Practical example 2 | 0.930 mm |
| Practical example 3 | 0.820 mm |

At the telephoto end with a photographing distance of infinity (∞), the image eccentricity in a case where a zoom lens system is inclined by a given angle is equal to the image eccentricity in a case where the image blur correction lens group has made parallel translation in a direction vertical to the optical axis by each of the above-described values.

As is obvious from each lateral aberration diagram, the lateral aberration at an image point on the axis has a favorable symmetry. Comparisons of lateral aberration between at +70% image point and at −70% image point in a basic state show that both have a small curve degree and an approximately equal gradient of the aberration curve, and thus the eccentric coma aberration and the eccentric astigmatism prove to be small. This means sufficient image-forming performance is achieved even in an image blur correction state. For the same image blur correction angle of a zoom lens system, a shorter focal length of the entire zoom lens system leads to a smaller distance of parallel movement required for blurring correction. Hence, sufficient image blur correction can be performed without the image-forming characteristics deteriorating for an image blur correction angle to a given angle at any zoom position.

Numerical Practical Example 1

The zoom lens system of numerical practical example 1 corresponds to the first embodiment shown in FIG. 1. Table 1 shows surface data of the zoom lens system of numerical practical example 1. Table 2 shows aspheric data. Tables 3A through 3D show various data in an infinity focusing state.

(Surface Data)

TABLE 1

| Surface No. | r | d | nd | vd |
|---|---|---|---|---|
| Object surface | ∞ | | | |
| 1 | 100.06160 | 2.20000 | 1.80610 | 33.3 |
| 2 | 67.50200 | 0.50000 | | |
| 3 | 67.19710 | 8.23000 | 1.49700 | 81.6 |
| 4 | 894.41750 | 0.20000 | | |
| 5 | 187.16930 | 3.60430 | 1.43700 | 95.0 |
| 6 | 10935.15130 | variable | | |
| 7 | 66.68480 | 3.74160 | 1.78472 | 25.7 |
| 8 | −239.69110 | 0.01000 | 1.56732 | 42.8 |
| 9 | −239.69110 | 1.30000 | 1.54814 | 45.8 |
| 10 | 53.01340 | 19.18400 | | |
| 11 (aperture) | ∞ | 1.80000 | | |
| 12 | −269.01920 | 0.80000 | 1.84666 | 23.8 |
| 13 | 49.41850 | 0.01000 | 1.56732 | 42.8 |
| 14 | 49.41850 | 2.20560 | 1.51742 | 52.1 |
| 15 | 817.66370 | 2.96900 | | |
| 16 | −45.56550 | 1.75350 | 1.80610 | 33.3 |
| 17 | −29.41180 | 0.01000 | 1.56732 | 42.8 |
| 18 | −29.41180 | 0.80000 | 1.51823 | 59.0 |
| 19 | 82.23550 | variable | | |
| 20 | 37.08220 | 5.02730 | 1.49700 | 81.6 |
| 21 | −47.16140 | 0.40000 | | |
| 22 | 61.05640 | 4.75800 | 1.56732 | 42.8 |
| 23 | −30.54900 | 0.01000 | 1.56732 | 42.8 |
| 24 | −30.54900 | 0.80000 | 1.90366 | 31.3 |
| 25 | 1854.08490 | 2.00000 | | |
| 26 | −55.99840 | 0.80000 | 1.83481 | 42.7 |
| 27 | 21.46700 | 0.01000 | 1.56732 | 42.8 |
| 28 | 21.46700 | 5.09020 | 1.69895 | 30.0 |
| 29 | −121.98450 | 23.14160 | | |
| 30 | 151.96250 | 4.37150 | 1.51742 | 52.1 |
| 31 | −30.71290 | 0.20000 | | |
| 32 | 48.52190 | 4.95390 | 1.51823 | 59.0 |
| 33 | −30.62320 | 0.01000 | 1.56732 | 42.8 |

TABLE 1-continued

| Surface No. | r | d | nd | vd |
|---|---|---|---|---|
| 34 | −30.62320 | 0.80000 | 1.90366 | 31.3 |
| 35 | −172.12560 | variable | | |
| 36* | 63.90120 | 0.80000 | 1.49710 | 81.6 |
| 37* | 18.36410 | variable | | |
| 38 | −46.46240 | 0.80000 | 1.61800 | 63.4 |
| 39 | 18.78150 | 0.01000 | 1.56732 | 42.8 |
| 40 | 18.78150 | 3.59480 | 1.67270 | 32.2 |
| 41 | 1456.48430 | variable | | |
| 42 | ∞ | 4.20000 | 1.51680 | 64.2 |
| 43 | ∞ | BF | | |
| Image surface | ∞ | | | |

(Aspheric Surface Data)

TABLE 2

Thirty-sixth surface $\kappa = 0.00000E+00$, $A4 = -8.12688E-06$, $A6 = 1.14467E-07$,
$A8 = 7.22357E-10$, $A10 = -1.59277E-11$ Thirty-seventh surface $\kappa = 0.00000E+00$, $A4 = -1.07383E-05$, $A6 = 8.31780E-08$,
$A8 = 1.93598E-09$, $A10 = -2.96510E-11$ (Various Data in Infinity Focusing State)

TABLE 3A

| | Wide-angle end | Intermediate position | Telephoto end |
|---|---|---|---|
| Focal length | 103.0054 | 199.9222 | 388.0283 |
| Zoom ratio | 1.00000 | 1.94089 | 3.76707 |
| F number | 4.12033 | 5.17059 | 6.49059 |
| View angle | 5.8880 | 3.0455 | 1.5774 |
| Image height | 10.8150 | 10.8150 | 10.8150 |
| Total lens length | 184.0949 | 231.9725 | 259.6874 |
| BF | 1.09447 | 0.97213 | 1.05519 |
| d6 | 1.0000 | 49.0000 | 76.6317 |
| d19 | 19.4767 | 14.3942 | 3.8806 |
| d35 | 17.5845 | 10.9731 | 2.0000 |
| d37 | 22.1439 | 21.3971 | 20.0000 |
| d41 | 11.7000 | 24.1407 | 45.0246 |
| Entrance pupil position | 43.1468 | 145.5110 | 259.6189 |
| Exit pupil position | −72.8754 | −79.4276 | −93.3378 |
| Front principal point | 2.7138 | −151.6939 | −947.4505 |
| Rear principal point | 81.0894 | 32.0504 | −128.3410 |

TABLE 3B

Data of Single Lens

| Lens elements | First surface | Focal length |
|---|---|---|
| L1 | 1 | −265.3475 |
| L2 | 3 | 145.7080 |
| L3 | 5 | 435.7193 |
| L4 | 7 | 66.8418 |
| L5 | 9 | −79.0741 |
| L6 | 12 | −49.2536 |
| L7 | 14 | 101.5538 |
| L8 | 16 | 98.1635 |
| L9 | 18 | −41.7013 |
| L10 | 20 | 42.6140 |
| L11 | 22 | 36.5782 |
| L12 | 24 | −33.2512 |
| L13 | 26 | −18.5019 |
| L14 | 28 | 26.5040 |
| L15 | 30 | 49.7843 |

TABLE 3B-continued

Data of Single Lens

| Lens elements | First surface | Focal length |
|---|---|---|
| L16 | 32 | 37.0187 |
| L17 | 34 | −41.3328 |
| L18 | 36 | −52.1444 |
| L19 | 38 | −21.5415 |
| L20 | 40 | 28.2559 |

TABLE 3C

Data of Zoom Lens Groups

| Lens groups | First surface | Focal length | Lens configuration length | Front principal point | Rear principal point |
|---|---|---|---|---|---|
| G1 | 1 | 190.14254 | 14.73430 | 2.12129 | 6.85443 |
| G2 | 7 | −50.06006 | 34.58370 | 36.23257 | 36.30302 |
| G3 | 20 | 44.14465 | 52.37250 | 38.01837 | 26.12802 |
| G4 | 36 | −52.14441 | 0.80000 | 0.75426 | 1.01676 |
| G5 | 38 | −92.21687 | 4.40480 | −0.02337 | 1.73399 |

TABLE 3D

Magnification of zoom lens groups

| Lens groups | First surface | Wide-angle end | Intermediate position | Telephoto end |
|---|---|---|---|---|
| G1 | 1 | 0.00000 | 0.00000 | 0.00000 |
| G2 | 7 | −0.52711 | −1.06579 | −2.58864 |
| G3 | 20 | −0.50120 | −0.40145 | −0.25127 |
| G4 | 36 | 1.71202 | 1.84585 | 2.01283 |
| G5 | 38 | 1.19773 | 1.33131 | 1.55868 |

Numerical Practical Example 2

The zoom lens system of numerical practical example 2 corresponds to the second embodiment shown in FIG. 4. Table 4 shows surface data of the zoom lens system of numerical practical example 2. Table 5 shows aspheric data. Tables 6A through 6D show various data in an infinity focusing state.

(Surface Data)

TABLE 4

| Surface No. | r | d | nd | vd |
|---|---|---|---|---|
| Object surface | ∞ | | | |
| 1 | 109.12370 | 2.20000 | 1.80610 | 33.3 |
| 2 | 67.44820 | 0.50000 | | |
| 3 | 67.10640 | 6.85210 | 1.49700 | 81.6 |
| 4 | 293.87390 | 0.20000 | | |
| 5 | 140.75750 | 5.31170 | 1.49700 | 81.6 |
| 6 | −525.23090 | variable | | |
| 7 | 45.83450 | 5.30480 | 1.80518 | 25.5 |
| 8 | −286.94940 | 0.01000 | 1.56732 | 42.8 |
| 9 | −286.94940 | 0.80000 | 1.62004 | 36.3 |
| 10 | 42.47790 | 17.52850 | | |
| 11 | −250.42960 | 0.80000 | 1.84666 | 23.8 |
| 12 | 37.69820 | 0.01000 | 1.56732 | 42.8 |
| 13 | 37.69820 | 2.48050 | 1.56732 | 42.8 |
| 14 | 137.26890 | 9.30790 | | |
| 15 | −42.05600 | 1.50080 | 1.80518 | 25.5 |
| 16 | −30.13390 | 0.20000 | | |
| 17 | −32.25810 | 0.80000 | 1.56883 | 56.0 |
| 18 | 90.51700 | 1.70590 | | |
| 19 (aperture) | ∞ | variable | | |
| 20 | 38.09930 | 4.78770 | 1.49700 | 81.6 |
| 21 | −53.18270 | 0.40000 | | |

TABLE 4-continued

| Surface No. | r | d | nd | vd |
|---|---|---|---|---|
| 22 | 53.78720 | 5.03010 | 1.54814 | 45.8 |
| 23 | −30.89420 | 0.01000 | 1.56732 | 42.8 |
| 24 | −30.89420 | 0.80000 | 1.90366 | 31.3 |
| 25 | −738.24690 | 2.39810 | | |
| 26 | −63.65240 | 0.80000 | 1.83481 | 42.7 |
| 27 | 22.26330 | 0.01000 | 1.56732 | 42.8 |
| 28 | 22.26330 | 4.99370 | 1.69895 | 30.0 |
| 29 | −128.84210 | 16.61420 | | |
| 30 | 120.69590 | 4.36650 | 1.51742 | 52.1 |
| 31 | −30.62540 | 0.20000 | | |
| 32 | 38.94020 | 4.94570 | 1.51823 | 59.0 |
| 33 | −32.85770 | 0.01000 | 1.56732 | 42.8 |
| 34 | −32.85770 | 0.80000 | 1.90366 | 31.3 |
| 35 | −865.48620 | variable | | |
| 36* | 88.83300 | 0.80000 | 1.49710 | 81.6 |
| 37* | 20.44880 | variable | | |
| 38 | −84.84820 | 0.80000 | 1.80420 | 46.5 |
| 39 | 25.96370 | 0.01000 | 1.56732 | 42.8 |
| 40 | 25.96370 | 2.92040 | 1.84666 | 23.8 |
| 41 | 245.50180 | variable | | |
| 42 | ∞ | 4.20000 | 1.51680 | 64.2 |
| 43 | ∞ | BF | | |
| Image surface | ∞ | | | |

(Aspheric Surface Data)

TABLE 5

Thirty-sixth surface

κ = 0.00000E+00, A4 = 4.50634E−05, A6 = −5.17727E−07,
A8 = 2.75710E−09, A10 = −7.82291E−12

Thirty-seventh surface

κ = 0.00000E+00, A4 = 4.71906E−05, A6 = −4.64808E−07,
A8 = 1.74656E−09, A10 = −4.65745E−12

(Various Data in Infinity Focusing State)

TABLE 6A

| | Wide-angle end | Intermediate position | Telephoto end |
|---|---|---|---|
| Focal length | 103.0057 | 199.9199 | 388.0146 |
| Zoom ratio | 1.00000 | 1.94086 | 3.76692 |
| F number | 4.12039 | 5.17066 | 6.49053 |
| View angle | 5.9001 | 3.0438 | 1.5744 |
| Image height | 10.8150 | 10.8150 | 10.8150 |
| Total lens length | 184.0715 | 224.0498 | 250.0984 |
| BF | 1.07147 | 0.94968 | 1.10085 |
| d6 | 1.0000 | 41.1000 | 66.9974 |
| d19 | 18.8597 | 12.4399 | 1.8000 |
| d35 | 13.4231 | 9.3753 | 2.0000 |
| d37 | 27.6086 | 20.6617 | 15.9138 |
| d41 | 11.7000 | 29.1146 | 51.8778 |
| Entrance pupil position | 73.7400 | 187.2512 | 338.7995 |
| Exit pupil position | −62.6815 | −74.2537 | −90.1584 |
| Front principal point | 10.3195 | −144.2941 | −922.9395 |
| Rear principal point | 81.0658 | 24.1299 | −137.9161 |

TABLE 6B

Data of Single Lens

| Lens elements | First surface | Focal length |
|---|---|---|
| L1 | 1 | −224.3751 |
| L2 | 3 | 173.2428 |
| L3 | 5 | 223.9508 |

TABLE 6B-continued

Data of Single Lens

| Lens elements | First surface | Focal length |
|---|---|---|
| L4 | 7 | 49.4357 |
| L5 | 9 | −59.6191 |
| L6 | 11 | −38.6507 |
| L7 | 13 | 90.7893 |
| L8 | 15 | 125.0005 |
| L9 | 17 | −41.7111 |
| L10 | 20 | 45.4545 |
| L11 | 22 | 36.5685 |
| L12 | 24 | −35.7003 |
| L13 | 26 | −19.6747 |
| L14 | 28 | 27.5338 |
| L15 | 30 | 47.6788 |
| L16 | 32 | 35.2155 |
| L17 | 34 | −37.8129 |
| L18 | 36 | −53.6451 |
| L19 | 38 | −24.6413 |
| L20 | 40 | 34.0847 |

TABLE 6C

Data of Zoom Lens groups

| Lens groups | First surface | Focal length | Lens configuration length | Front principal point | Rear principal point |
|---|---|---|---|---|---|
| G1 | 1 | 178.17838 | 15.06380 | 3.56898 | 8.47678 |
| G2 | 7 | −41.90178 | 40.44840 | 42.01295 | 39.69068 |
| G3 | 20 | 39.34189 | 46.16600 | 27.72846 | 22.52163 |
| G4 | 36 | −53.64513 | 0.80000 | 0.69686 | 0.96041 |
| G5 | 38 | −88.17738 | 3.73040 | 0.54730 | 2.25684 |

TABLE 6D

Magnification of Zoom Lens Groups

| Lens groups | First surface | Wide-angle end | Intermediate position | Telephoto end |
|---|---|---|---|---|
| G1 | 1 | 0.00000 | 0.00000 | 0.00000 |
| G2 | 7 | −0.48343 | −0.89963 | −2.02627 |
| G3 | 20 | −0.56073 | −0.48461 | −0.33411 |
| G4 | 36 | 1.78772 | 1.85276 | 1.95074 |
| G5 | 38 | 1.19295 | 1.38907 | 1.64893 |

Numerical Practical Example 3

The zoom lens system of numerical practical example 3 corresponds to the third embodiment shown in FIG. 7. Table 7 shows surface data of the zoom lens system of numerical practical example 3. Table 8 shows aspheric data. Tables 9A through 9D show various data in an infinity focusing state.

(Surface Data)

TABLE 7

| Surface No. | r | d | nd | vd |
|---|---|---|---|---|
| Object surface | ∞ | | | |
| 1 | 111.52190 | 2.20000 | 1.80610 | 33.3 |
| 2 | 61.02740 | 0.01000 | 1.56732 | 42.8 |
| 3 | 61.02740 | 5.14960 | 1.59282 | 68.6 |
| 4 | 172.27030 | 0.20000 | | |
| 5 | 97.10050 | 5.16900 | 1.49700 | 81.6 |
| 6 | −935.19380 | variable | | |
| 7 | 45.33960 | 4.84300 | 1.80518 | 25.5 |
| 8 | −159.13700 | 0.01000 | 1.56732 | 42.8 |
| 9 | −159.13700 | 0.80000 | 1.62004 | 36.3 |
| 10 | 54.00980 | 15.19130 | | |
| 11 | −692.52560 | 0.80000 | 1.84666 | 23.8 |

TABLE 7-continued

| Surface No. | r | d | nd | vd |
|---|---|---|---|---|
| 12 | 26.12640 | 0.01000 | 1.56732 | 42.8 |
| 13 | 26.12640 | 2.14510 | 1.58144 | 40.9 |
| 14 | 64.76980 | 2.31760 | | |
| 15 | −50.90710 | 1.31380 | 1.80518 | 25.5 |
| 16 | −35.21860 | 0.20000 | | |
| 17 | −40.43450 | 0.80000 | 1.74330 | 49.2 |
| 18 | 110.84260 | 1.57550 | | |
| 19 (aperture) | ∞ | variable | | |
| 20 | 41.85100 | 3.98580 | 1.49700 | 81.6 |
| 21 | −56.27000 | 0.20000 | | |
| 22 | 154.97430 | 1.68040 | 1.49700 | 81.6 |
| 23 | −179.97080 | 0.20000 | | |
| 24 | 115.35270 | 3.72610 | 1.54814 | 45.8 |
| 25 | −31.51190 | 0.01000 | 1.56732 | 42.8 |
| 26 | −31.51190 | 0.80000 | 1.90366 | 31.3 |
| 27 | −100.04270 | variable | | |
| 28 | −32.26500 | 0.80000 | 1.83481 | 42.7 |
| 29 | 28.84920 | 0.01000 | 1.56732 | 42.8 |
| 30 | 28.84920 | 3.88700 | 1.69895 | 30.0 |
| 31 | −73.17790 | 11.44280 | | |
| 32 | 518.40640 | 4.03860 | 1.51742 | 52.1 |
| 33 | −26.67810 | 0.20000 | | |
| 34 | 50.72660 | 4.44870 | 1.51823 | 59.0 |
| 35 | −26.76570 | 0.01000 | 1.56732 | 42.8 |
| 36 | −26.76570 | 0.80000 | 1.90366 | 31.3 |
| 37 | −79.44420 | variable | | |
| 38* | 89.20270 | 0.80000 | 1.49710 | 81.6 |
| 39* | 20.91380 | variable | | |
| 40 | −85.01730 | 0.80000 | 1.80420 | 46.5 |
| 41 | 22.27810 | 0.01000 | 1.56732 | 42.8 |
| 42 | 22.27810 | 2.65620 | 1.84666 | 23.8 |
| 43 | 145.83210 | variable | | |
| 44 | ∞ | 4.20000 | 1.51680 | 64.2 |
| 45 | ∞ | BF | | |
| Image surface | ∞ | | | |

(Aspheric Surface Data)

TABLE 8

Thirty-eighth surface $\kappa = 0.00000E+00$, $A4 = 5.53040E-05$, $A6 = -8.74771E-07$,
$A8 = 8.91726E-09$, $A10 = -4.71040E-11$ Thirty-ninth surface $\kappa = 0.00000E+00$, $A4 = 6.02177E-05$, $A6 = -8.76790E-07$,
$A8 = 9.24437E-09$, $A10 = -5.55747E-11$ Various Data in Infinity Focusing State

TABLE 9A

| | Wide-angle end | Intermediate position | Telephoto end |
|---|---|---|---|
| Focal length | 103.0203 | 187.0117 | 339.5180 |
| Zoom ratio | 1.00000 | 1.81529 | 3.29564 |
| F number | 4.12082 | 5.16344 | 6.49079 |
| View angle | 5.8937 | 3.2537 | 1.7988 |
| Image height | 10.8150 | 10.8150 | 10.8150 |
| Total lens length | 160.0266 | 190.9791 | 220.9254 |
| BF | 1.02411 | 0.97660 | 0.97443 |
| d6 | 1.0000 | 32.0000 | 61.9484 |
| d19 | 16.5852 | 9.0733 | 1.8000 |
| d27 | 4.7810 | 5.7197 | 2.6664 |
| d37 | 11.2758 | 8.8595 | 1.9998 |
| d39 | 26.2200 | 17.1291 | 15.0002 |
| d43 | 11.7000 | 29.7804 | 49.0957 |
| Entrance pupil position | 55.0606 | 125.9696 | 256.4324 |

TABLE 9A-continued

| | Wide-angle end | Intermediate position | Telephoto end |
|---|---|---|---|
| Exit pupil position | −58.0366 | −69.7179 | −83.7243 |
| Front principal point | −21.6185 | −181.7303 | −765.0204 |
| Rear principal point | 57.0063 | 3.9674 | −118.5926 |

TABLE 9B

Data of Single Lens

| Lens elements | First surface | Focal length |
|---|---|---|
| L1 | 1 | −170.5221 |
| L2 | 3 | 156.7189 |
| L3 | 5 | 177.2916 |
| L4 | 7 | 44.2919 |
| L5 | 9 | −64.9414 |
| L6 | 11 | −29.7211 |
| L7 | 13 | 73.8070 |
| L8 | 15 | 136.8198 |
| L9 | 17 | −39.7689 |
| L10 | 20 | 48.9512 |
| L11 | 22 | 167.8255 |
| L12 | 24 | 45.5630 |
| L13 | 26 | −51.1898 |
| L14 | 28 | −18.1366 |
| L15 | 30 | 30.0755 |
| L16 | 32 | 49.1606 |
| L17 | 34 | 34.4848 |
| L18 | 36 | −44.9930 |
| L19 | 38 | −55.1705 |
| L20 | 40 | −21.8776 |
| L21 | 42 | 30.7542 |

TABLE 9C

Data of Zoom Lens Groups

| Lens groups | First surface | Focal length | Lens configuration length | Front principal point | Rear principal point |
|---|---|---|---|---|---|
| G1 | 1 | 169.03373 | 12.72860 | 1.45372 | 6.01125 |
| G2 | 7 | −41.90027 | 30.00630 | 37.55049 | 34.12547 |
| G3 | 20 | 35.04890 | 10.60230 | 1.84597 | 5.35215 |
| G4 | 28 | 57.30903 | 25.63710 | 27.27132 | 42.77534 |
| G5 | 38 | −55.17052 | 0.80000 | 0.70074 | 0.96429 |
| G6 | 40 | −74.41918 | 3.46620 | 0.74636 | 2.33702 |

TABLE 9D

Magnification of Zoom Lens Groups

| Lens groups | First surface | Wide-angle end | Intermediate position | Telephoto end |
|---|---|---|---|---|
| G1 | 1 | 0.00000 | 0.00000 | 0.00000 |
| G2 | 7 | −0.51182 | −0.82374 | −2.00315 |
| G3 | 20 | −0.82258 | −0.72766 | −0.38809 |
| G4 | 28 | 0.68318 | 0.71978 | 0.80977 |
| G5 | 38 | 1.73208 | 1.74960 | 1.84945 |
| G6 | 40 | 1.22336 | 1.46568 | 1.72519 |

Corresponding Values of Conditions

Following table 10 shows corresponding values of conditions rounded off to the second decimal place.

TABLE 10

| | Numerical practical example 1 | Numerical practical example 2 | Numerical practical example 3 |
|---|---|---|---|
| Condition (1) | −3.80 | −4.25 | −4.03 |
| Condition (2) | 0.61 | 0.45 | 0.53 |

INDUSTRIAL APPLICABILITY

A zoom lens system according to the present disclosure is applicable to a digital still camera, an interchangeable lens digital camera, a digital video camera, a camera unit of a mobile phone, a camera unit of a personal digital assistance (PDA), a monitoring camera in a monitoring system, a web camera, and a vehicle-mounted camera, for example, and is ideal especially for a photographing optical system requiring high image quality such as a digital still camera system and a digital video camera system.

What is claimed is:

1. A zoom lens system, in order from an object side to an image side, comprising:
    a first lens group with positive optical power;
    a second lens group with negative optical power; and
    a subsequent lens group with positive optical power as a whole including three or four lens groups,
    wherein in the subsequent lens group, both a lens group closest to the image side and a lens group next to the lens group closest to the image side have negative optical power, and
    during zooming operation,
       the first lens group moves along an optical axis, and
       the second lens group does not move along the optical axis, and
    wherein the second lens group has an aperture stop and satisfies condition (1) below, $$-9.0 \le fG1/fG2 \le -2.0 \quad (1)$$

where
    fG1 is a focal length of the first lens group, and
    fG2 is a focal length of the second lens group.

2. The zoom lens system of claim 1, wherein the zoom lens system satisfies condition (2) below, $$0.4 \le LG2a/LG2 \le 0.9 \quad (2)$$

where
    LG2a is a largest size of air spaces inside the second lens group, and
    LG2 is a thickness of the second lens group along the optical axis.

3. The zoom lens system of claim 1, wherein some lens elements of the second lens group move so as to have a component vertical to the optical axis in image blur correction.

4. The zoom lens system of claim 1, wherein the first lens group is composed of three single lenses.

5. The zoom lens system of claim 1, wherein the subsequent lens group is composed of:
    a third lens group with positive optical power;
    a fourth lens group with negative optical power; and
    a fifth lens group with negative optical power.

6. The zoom lens system of claim 1, wherein the subsequent lens group is composed of:
    a third lens group with positive optical power;
    a fourth lens group with positive optical power;
    a fifth lens group with negative optical power; and
    a sixth lens group with negative optical power.

7. An imaging apparatus comprising:
    a zoom lens system that forms an optical image of an object; and
    an imaging element that converts the optical image formed by the zoom lens system to an electrical image signal,
    wherein the zoom lens system, in order from an object side to an image side, comprising:
       a first lens group with positive optical power;
       a second lens group with negative optical power; and
       a subsequent lens group with positive optical power as a whole including three or four lens groups,
    wherein, in the subsequent lens group, both a lens group closest to the image side and a lens group next to the lens group closest to the image side have negative optical power, and
    during zooming operation,
       the first lens group moves along an optical axis, and
       the second lens group does not move along the optical axis, and
    wherein the second lens group has an aperture stop and satisfies condition (1) below, $$-9.0 \le fG1/fG2 \le -2.0 \quad (1)$$

where
    fG1 is a focal length of the first lens group, and
    fG2 is a focal length of the second lens group.

8. A camera comprising:
    a zoom lens system that forms an optical image of an object; and
    an imaging element that converts the optical image formed by the zoom lens system to an electrical image signal,
    wherein the zoom lens system, in order from an object side to an image side, comprising:
       a first lens group with positive optical power;
       a second lens group with negative optical power; and
       a subsequent lens group with positive optical power as a whole including three or four lens groups,
    wherein, in the subsequent lens group, both a lens group closest to the image side and a lens group next to the lens group closest to the image side have negative optical power, and
    during zooming operation,
       the first lens group moves along an optical axis, and
       the second lens group does not move along the optical axis,
    wherein the second lens group has an aperture stop and satisfies condition (1) below, $$-9.0 \le fG1/fG2 \le -2.0 \quad (1)$$

where
    fG1 is a focal length of the first lens group, and
    fG2 is a focal length of the second lens group, and
    wherein the camera performs at least one of displaying and storing the image signal converted by the imaging element.

* * * * *